Figure 1:
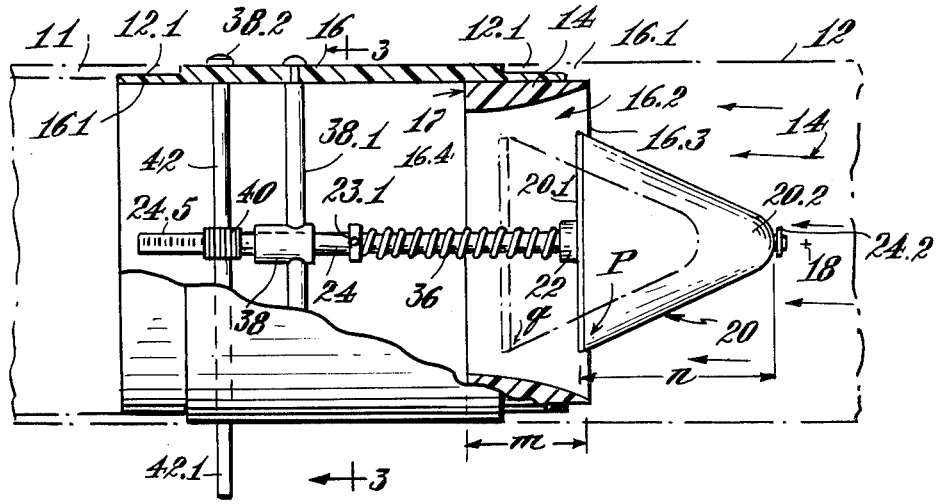

June 14, 1966  D. GORCHEV ET AL  3,255,963

THERMOSTATICALLY DETERMINED CONSTANT VOLUME FLUID SUPPLY SYSTEM

Original Filed April 13, 1961  2 Sheets-Sheet 1

INVENTORS
Dimiter Gorchev
Hend Gorchev
by Roberts, Cushman & Grover,
ATT'YS.

United States Patent Office 3,255,963
Patented June 14, 1966

3,255,963
THERMOSTATICALLY DETERMINED CONSTANT VOLUME FLUID SUPPLY SYSTEM
Dimiter Gorchev and Hend Gorchev, both of Cambridge, Mass.; said Dimiter Gorchev assignor to Boston Fluid Control Corporation, Cambridge, Mass., a corporation of Massachusetts
Continuation of application Ser. No. 102,747, Apr. 13, 1961. This application June 26, 1963, Ser. No. 290,731
2 Claims. (Cl. 236—1)

This is a continuation of our application Serial No. 102,747, filed April 13, 1961, now abandoned, which is a continuation-in-part of our application Serial No. 30,330, filed May 19, 1960, now abandoned.

The field of this invention is that of regulated fluid supply systems and regulating valves, and the invention relates more particularly to valves for maintaining constant volume fluid flow in a conduit, and to a system utilizing valves of this type.

In forced air heating or air conditioning systems it is desirable that the flow of air into any particular area be controlled locally as by a thermostat. The varying demands thus placed on the system by multiple local controls may introduce substantial fluctuations of the air pressure in the supply mains. If no steps are taken to counteract these fluctuations, each local adjustment may affect the balance of the entire system, causing short term variations in the supply of air to at least some of the other areas, which variations tend to be physiologically and psychologically more disturbing in terms of draft and noise sensations than the relatively less frequent variations introduced by the local control apparatus. One attempt to rectify this difficulty has been to place a pressure-sensitive central control device on the main pressure supply which will, for example, regulate a main fan so as to maintain its output at constant pressure. Such systems however do not alleviate the above mentioned disturbances since the varying local demand causes local pressure fluctuations due to the varying volume of air being drawn through substantial lengths of duct work between the outlets and the control point. Thus the added expense of central control is largely wasted for this purpose.

Objects of the present invention are to provide an air supply system in which the delivery of air to any particular area can be locally controlled independently of the conditions existing in any other area; to provide such a system wherein local air supply at any particular area is not disturbed by regulation at another area; and to provide such a system which does not require central regulation and operates at least just as well without central regulation.

The substance of the invention can be briefly summarized as involving in its principal aspect a central source of air pressure which can be unregulated, a plurality of ducts each leading from the source to, and terminating at a separate local area to be supplied, a plurality of control devices such as thermostats, one for each of the local areas, for indicating the quantity of air to be supplied to that area, in each of the ducts a valve that is adjustable by the control device for the area supplied by the respective duct, and which valve will, for each adjustment position, pass a constant volume of air over a variety of differential pressures, and means responsive to the control devices for adjusting the respective valves.

These and other objects, aspects, advantages and results of the invention will appear from the following detailed description of several practical embodiments thereof illustrating its novel characteristics.

Figure 2:
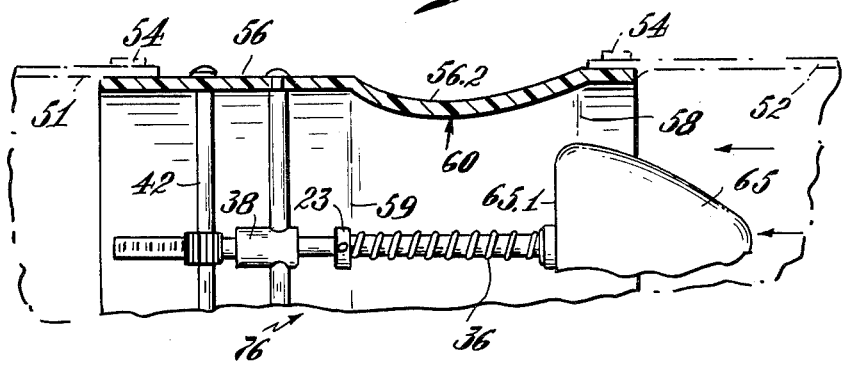
Figure 3:
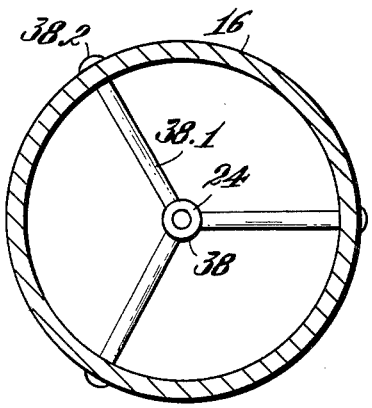
Figure 4:
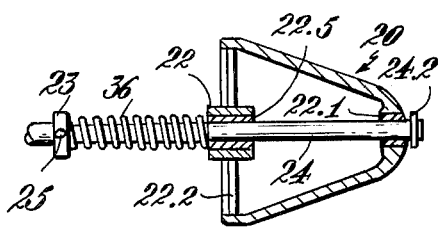
Figure 5:
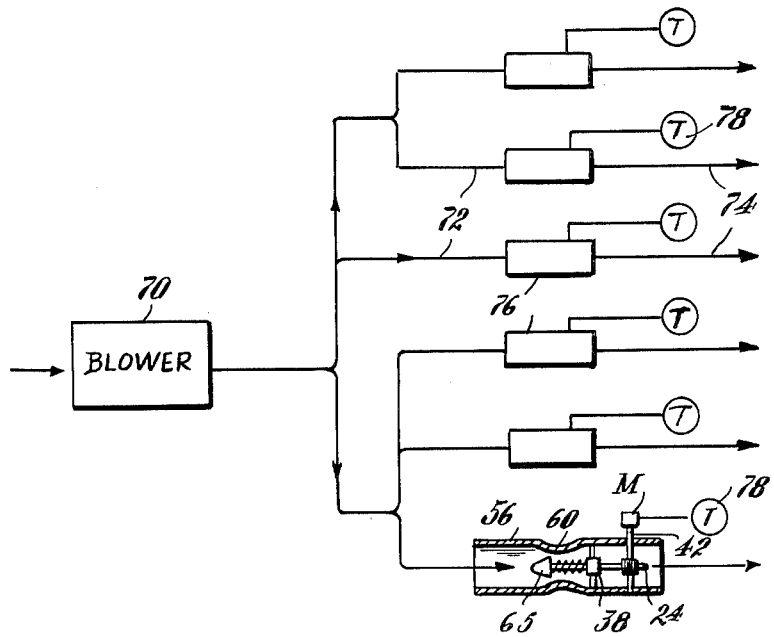
Figure 6:
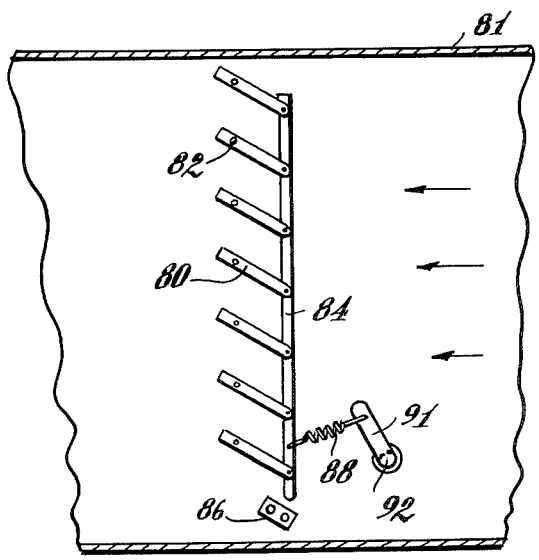

The description refers to drawings in which
FIG. 1 is a side elevation view, partially in section, of a valve for purposes of the invention;
FIG. 2 is a partial section view similar to FIG. 1 showing an alternative embodiment of a valve for purposes of the invention;
FIG. 3 is a section view along line 3—3 of FIG. 1;
FIG. 4 is a partial section view, to enlarged scale, along the longitudinal axis of the valve plunger illustrated in FIG. 1;
FIG. 5 is a diagrammatic illustration of an air supply system according to the invention; and
FIG. 6 is a side elevation view, in section, of another valve functioning similarly to those of FIGS. 1 to 4.

Referring to the drawing, FIG. 1 illustrates one embodiment of the flow regulating valve according to this invention wherein the valve is mounted within a conduit indicated by the broken lines 11 and 12, in which fluid flow occurs between an area of relatively high fluid pressure and an area of relatively low fluid pressure in the direction indicated by the arrows $f$. As will be readily understood, the fluid flow velocity through the valve is determined by the fluid pressure differential thereacross. As illustrated, the valve is particularly well adapted for regulating air flow through the conduit 11, 12 but it should be understood that the valve is also well suited for regulating the flow of other gases and liquids if proper means are provided for forming a seal between the valve and the conduit.

The valve includes a tubular member 16 having portions of reduced diameter, as at 16.1, which are adapted to form lapped joints with correspondingly grooved portions 12.1 of the conduit 12, and can be conveniently secured within the conduit 12 by means of force fitting with the matching conduit grooves, as shown, or by any other suitable means such as soldering, cementing or bolting at 14. The tubular member has a bore portion 16.2 of a selected length $m$ which converges from a fluid inlet opening or end 16.3 of a cross-sectional area and configuration corresponding to that of the conduit to an outlet and 16.4 of smaller cross-sectional area. The converging bore portion can be embodied in an individual sleeve 17 forcefitted within the tubular member as shown or can be provided as an integral part of the tubular member, the taper of the bore portion being adapted to constrict fluid flow through the conduit without creating turbulence in the conduit adjacent the fluid inlet opening 16.3, as at the region indicated by asterisk 18.

The valve further includes a plunger 20 having a base portion 20.1 and a nose portion 20.2 which diverges in the direction of flow towards the base for a distance $n$. As shown particularly in FIG. 4, the plunger 20 has a hub 22 near its base. This hub has a base bushing 22.5 and is held by several, such as three, legs 22.2. The tip of the plunger 20 has a perforation with a tip bushing 22.1.

At the end of shaft 24 is a nose collar means such as a retaining ring 24.2 which keeps the bushing 22.1 on the shaft. A hub collar means 23 is adjustably secured to the shaft 24, for example by means of a set screw 23.1 and a coil spring 36 is disposed on the shaft between the collar 23 and the hub bushing 22.1 for biasing the plunger to oppose movement in the direction of fluid flow. The adjustable collar 23 can be positioned on the shaft which is mounted relatively to the tubular member as will be described below, so that the spring 36 holds the plunger in the position shown in full lines in FIG. 1, for example, against a selected differential in the fluid pressures exerted on the base and nose portions of the plunger, thereby to permit a selected volume of fluid to move through the restricted passage indicated at $p$. If fluid pressure in the conduit increases, the force exerted on the plunger nose portion will also increase thereby moving the plunger against the bias of the spring 36 to the position shown, by way of example, in dotted lines in FIG. 1. This plunger movement reduces the passage to the size indicated at $q$ and it will be readily understood that the taper of the bore portion 16.2 can be proportioned with respect to the characteristics of the spring 36 as set by collar 23 such that reduction of the passage size from that indicated at $p$ to that indicated at $q$ compensates for the increased pressure differential across the restricted passage, whereby the fluid volume moving through the passage will be constant for that spring setting and a given position of shaft 24. Since the resistance of the system downstream of the valve is by nature constant, the constant volume flow passed by the valve tends to make the discharge pressure at the valve outlet constant also.

The nose portion 20.2 of the plunger extends oppositely of the direction of fluid flow as shown and is tapered or faired to conduct fluid flow within the fluid passage partially defined by the plunger base without creating turbulence within the conduit as at point 18. Further, as the nose portion is of a length exceeding that of the converging bore portion 16.2 of the tubular member, the nose portion will extend within an area of the conduit which is free of turbulence even when the plunger base is located at the outlet end 16.4 of the bore portion.

For permitting adjustment of the rate of flow which is at any given time kept constant by the valve, the shaft 24 is slidably mounted in a sleeve bearing 38 which is supported in coaxial relation to the tubular member 16 by spider supports 38.1 the ends of which are riveted or otherwise fastened to the tubular member, as at 38.2. The shaft is provided with a rack section as at 24.5 and a pinion 40 is mounted upon a shaft 42 extending across the tubular member for cooperation with the shaft rack. The shaft 42 is rotatably supported in suitable bearings of the tubular member and has a control extension 42.1 which can be actuated from outside the valve, manually or by motor means (shown in FIG. 5) for rotating the pinion to move the shaft 24 in the bearing 38. Thus the bias of the spring 36 can be set, and the limits of travel of the plunger 20 can be adjusted externally. By means of this adjustment—as distinct from the above described initial adjustment by means of the collar 23 for setting a constant rate of flow for a given position of shaft 24—the size of the restricted fluid passage which corresponds to a given pressure differential can also be adjusted and accordingly the volume rate of flow which the valve tends to maintain can also be adjusted to conform to any value determined by external control means, such as thermostats, as will be described by way of example with reference to FIG. 5.

It will be seen that the valve provided by this invention is of inexpensive and yet rugged construction and that the valve can be conveniently adjusted over a wide range and is accurately responsive to variations in operating condition for providing constant fluid flow volume through the conduit. It will also be seen that, since the valve is adapted to regulate fluid flow without creating turbulence in the conduit and without requiring long fluid passages which are narrowly constricted, the valve does not introduce excessive resistance to fluid flow in the conduit under normal conditions. Further, the valve adjusting means are not likely to be clogged with lint or other extraneous matter which might be carried in the fluid flowing through the valve.

An alternative embodiment of the valve according to this invention is illustrated in FIG. 2. In this embodiment of the invention, the tubular member 56 is secured within the conduits 51, 52 by means of screws 54, and the constricted bore 56.2 of the tubular member is formed by a shaped, such as molded, portion of one of the conduit members itself. The inwardly converging bore portions of this tubular member have an inlet opening 58 and an outlet opening 59 which correspond in configuration and cross-sectional area to those of the conduits 11, 12, with an intermediate portion 60 of appropriately smaller cross-sectional area. In this construction, the plunger 65 is adapted for movement through that portion of the converging bore 56.2 which extends from the inlet end 58 to the smaller portion 60 in the same manner as described above with reference to FIG. 1, that portion of the converging bore between the narrow portion 60 and the outlet end 59 serving further to reduce turbulence of fluid flow through the valve. Preferably also, the edge 65.1 of the plunger base is rounded to reduce turbulence which might be created by the valve means.

An improved air supply system according to the invention in which the above-described valve is particularly useful will now be described with reference to FIG. 5. By way of example, this could be an air conditioning system which supplies more air cooled to a substantially constant temperature, if the regional temperature increases such as due to turning on of lamps, increased number of occupants, or warmer outside temperature, or vice versa.

A source of fluid under pressure, such as blower 70, taking in air from any conventional cooling or heating apparatus (not shown), is arranged to feed a plurality of ducts or conduits 72. The ducts are connected to outlets 74 through valves 76 preferably of the above-described type, these valves being independently controlled locally by means of control devices such as thermostats 78 so that the system provides a suitable amount of air to each area. One of the valves is diagrammatically shown according to FIG. 2, with a tubular member 56 having a constricted portion 60, with a plunger 65, a rod 24, a spring 36, and a shaft 42. A means for adjusting the valve setting, such as a regulating motor M sits on shaft 42 and is controlled by one of the thermostats 78. As explained previously, even if the blower 70 were regulated so as to provide a constant output pressure, the varying demands placed upon the system through the ducts 72 would produce local fluctuations in pressure since the ducts possess an appreciable resistance to flow, with detrimental results if valves were used which do not maintain constant volume for each local demand setting. If, however, the valves are of a type which pass a constant volume of fluid over a range of supply pressures such as valves described above with reference to FIGS. 1 to 4, these local fluctuations of pressure will not affect local delivery rates. Furthermore, this favorable mode of operation will exist even if the blower 70 is not regulated but rather is permitted to deliver air according to its natural characteristic.

While systems according to FIG. 5 make best use of the valves of the type shown in FIGS. 1–4, they can also be used with other types of valves having similar characteristics. FIG. 6 illustrates somewhat diagrammatically another form of constant volume valve which can be used in the system. This valve comprises a plurality of unbalanced louvres 80 pivoted to the body 81 of the valve as at 82 and arranged so that a fluid flow in the direction indicated by the arrows 83 will tend to decrease the available fluid passage. The action of the various louvres 80 are coupled by means of a bar 84, and a stop 86 is provided at one end of the bar so that the fluid passage can never be completely blocked. In the alternative the louvres 80 can be made narrower in width than the spacing between adjacent louvres so as to accomplish the same purpose.

For biasing the louvres against the force exerted by a fluid flow there is provided a spring 88 connected between the bar 84 and an adjusting crank 91. A shaft 92, corresponding to shaft 42 of FIGS. 1 and 2, connects the crank 91 to a regulating means such as a motor. The spring is effective between the crank 91 and the louvres 80 in a manner analogous to the connection of spring 36 of FIGS. 1 and 2, between collar 23 and plunger 20. The characteristics of the spring 88 are so chosen that, for a substantial range of differential pressures across the valve, the volume rate of flow and discharge pressure will remain constant. Typically a progressive rate spring will be required to insure stable operation.

It will now be evident that constant volume valves according to the invention and centrally unregulated fluid control systems incorporating such valves offer the following advantages and appreciably improved results among others similarly appearing from the above exposition of the substance and nature of the invention and from the description of several embodiments thereof.

The valves according to the invention permit easy and accurate continuous adjustment within a wide range of fluid flow as determined by a regulating device such as a thermostat, and they automatically maintain essentially constant volume and discharge pressure for any such adjustment. Furthermore, they accomplish this with simple means, without causing turbulence and substantial resistance losses.

Fluid control systems incorporating such valves provide optimal regulation without physiologically and psychologically detrimental effects, in addition to the advantages individually inherent in each valve, and in addition to the economic advantages of such optimal operation without central control. It should be noted that systems with conventional regional regulation, without as well as with central regulation exhibit the herein outlined defects whereas systems according to the present invention not only obviate central regulation with its initial cost and often cumbersome maintenance and unreliability but, in spite of the omission of central regulation, provide superior operational characteristics. As will now be evident, this is due to the fact that systems according to the invention provide optimal regional volume and discharge pressure regulation without affecting the other regions, as contrasted with central regulation systems wherein regulation at any region is likely to have detrimental effects on any other region.

While the system described above by way of example contemplates fairly simple regulation by way of thermostatically controlled supply of cold air, it will be understood that the invention is applicable to more complex systems such as using in addition temperature control of the supplied air, or individually controlled supplemental heat sources as for example regional radiators.

Although particular embodiments of the valve provided by this invention have been described for the purpose of illustration, it should be understood that the invention includes all modifications and equivalents thereof which fall within the scope of the appended claims.

We claim:
1. A system for supplying temperature conditioned air to various areas, comprising:
   a single central unregulated source of air under pressure and of given temperature;
   an air distributing assembly including a plurality of single terminal ducts each connecting said source to a separate outlet at one of said areas to supply thereto solely a single stream of selected volume of said air at said temperature;
   a plurality of thermostatic control devices, one for each of said areas, for indicating the volume of air to be supplied to the respective area;
   in each of said terminal ducts an adjustable valve of a type which, for each adjustment position thereof, will pass a corresponding volume of only said air, keeping said volume constant over a range of differential pressures corresponding to said position; and
   for each of said valves a respective motor means responsive to said thermostatic control device of the respective duct, for adjusting its valve to a position which corresponds to said indicated volume of said air;
   whereby each area is supplied with that volume of air of said temperature, from its single terminal duct which is indicated by the control device of the respective area, without being affected by the controlled air flow in the ducts connected to other areas.

2. A fluid supply system comprising:
   a source of unitary fluid under pressure and of given temperature;
   a plurality of single conduits each connected to said source and serving a separate area to be supplied with said unitary fluid solely from a respective conduit;
   a plurality of independent control devices, one for each of said areas, for indicating the rate at which said fluid at said temperature is to be supplied to the respective area;
   in each of said conduits an adjustable valve of a type which, for each adjustment position thereof, will pass to its area said unitary fluid at a rate that is constant over a range of differential pressures corresponding to said position; and
   a plurality of means, one for each valve and each being responsive to the control device for the area served by the conduit of its valve, for adjusting its said valve to a position which corresponds to said indicated rate;
   whereby each area is supplied with unitary fluid of said temperature at the rate indicated by its control device without being affected by the controlled flow of of fluid in the conduits serving other areas.

References Cited by the Examiner
UNITED STATES PATENTS

| | | | |
|---|---|---|---|
| 2,579,507 | 12/1951 | MacCracken. | |
| 2,587,815 | 3/1952 | Branson | 236—99 |
| 2,663,498 | 12/1953 | Copping | 236—1 |
| 2,793,812 | 5/1957 | McDonald | 236—13 |
| 2,835,449 | 5/1958 | Joesting | 236—13 |
| 2,991,937 | 7/1961 | Bottorf et al. | 236—13 |
| 3,058,664 | 10/1962 | Donahue | 236—13 |

ALDEN D. STEWART, *Primary Examiner.*

EDWARD J. MICHAEL, *Examiner.*